United States Patent [19]
Niklewski

[11] Patent Number: 5,220,846
[45] Date of Patent: Jun. 22, 1993

[54] ASYMMETRIC MECHANICAL VIBRATOR WITH EXTERNAL SETTING FOR VIBRATING SCREENS AND OTHER EQUIPMENT

[75] Inventor: Andrzej Niklewski, Sao Paulo, Brazil

[73] Assignee: Fabrica de Aco Paulista LTDA, Sorocaba, Brazil

[21] Appl. No.: 790,779

[22] Filed: Nov. 12, 1991

[30] Foreign Application Priority Data

Nov. 12, 1990 [BR] Brazil ............... PI 9005855[U]

[51] Int. Cl.⁵ .................. B06B 1/16; B07B 1/42
[52] U.S. Cl. .......................... 74/87; 74/61; 209/366.5; 366/128
[58] Field of Search ............... 74/61, 87; 209/366.5, 209/367; 366/128

[56] References Cited

U.S. PATENT DOCUMENTS

| | | | |
|---|---|---|---|
| 756,950 | 4/1904 | Fraser et al. | 209/366.5 |
| 952,565 | 3/1910 | Fraser | 74/87 |
| 1,083,652 | 1/1914 | Barrett | 209/366.5 |
| 1,388,097 | 8/1921 | Capsoni | 366/128 |
| 3,478,406 | 11/1969 | Auckland | 209/366.5 X |

Primary Examiner—Allan D. Herrmann
Attorney, Agent, or Firm—Darby & Darby

[57] ABSTRACT

An asymmetric mechanical vibrator with external adjustment for vibrating screens and other equipments having a bearing housing fixable to a sidewall P of the equipment and supporting through bearings a central portion of a shaft, which has an end portion, inside the equipment, carrying a balance eccentric counterweight with fixed axial positioning and predetermined axial extension and mass, the shaft having an end portion outside the equipment and carrying a main eccentric counterweight placed nearer the bearing housing than the balance counterweight and having axial dimension and mass greater than those of the balance counterweight, the axial positioning, axial dimension and mass of the main counterweight being selectively variable to generate determined eccentric forces on the vibrator and the same bending moment equal to that produced by the balance counterweight.

6 Claims, 9 Drawing Sheets

ASYMMETRIC MECHANICAL VIBRATOR WITH EXTERNAL SETTING FOR VIBRATING SCREENS AND OTHER EQUIPMENT

BACKGROUND OF THE INVENTION

The present invention refers, in a general way, to mechanical vibrators with a short shaft mounted inside closed or semi-closed boxes or casings, usually used in pairs and individually installed on sideplates of vibrating equipment with linear, circular and elliptical motions, either for screening, classification, transportation, dosing, feeding or simply vibration.

In a more specific way, the invention refers to a vibrator of the type that includes a bearing housing provided with external flanges for fixing the vibrator to sideplates of the equipment and supporting, through bearings, a determined portion of a shaft carrying counterweight means and being connectable to a motor unit and/or to other mechanical vibrator.

One of the most well known solutions to move vibrating screens with circular motion includes the provision of a mechanical vibrator, basically comprises of a single elongated shaft, transversally disposed in order to have its end portions journaled through respective bearings on opposite sideplates of the equipment and projecting outwardly therefrom for having its ends carrying respective counterweights.

Figure 1:
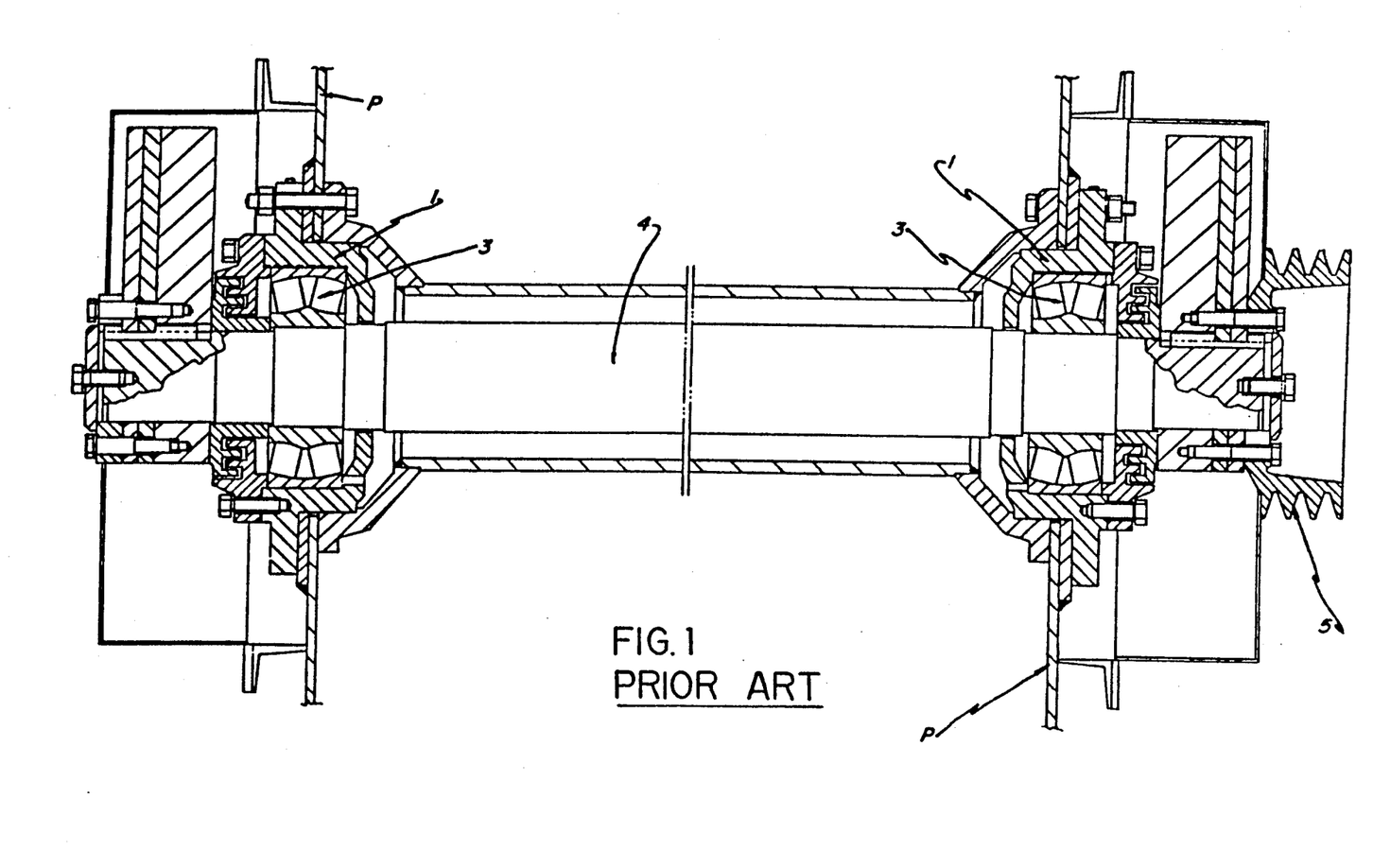
FIG. 1 represents a diametral longitudinal section view of a vibrator of the prior art, of the type that includes an elongated shaft transversally supported on opposite sidewalls of the equipment.

One of the ends of the single shaft is provided with means for coupling to the motor unit is as shown in FIG. 1.

This prior art construction, despite apparent simplicity, presents a series of inconveniences, such as:

Since the shaft is long and heavy, it is flexible, thereby adversely affecting the bearings;

The use of bearings of large dimensions is required;

The assembly and disassembly of bearings must usually occur at the site, which could be a high pollution environment.

Figure 2:
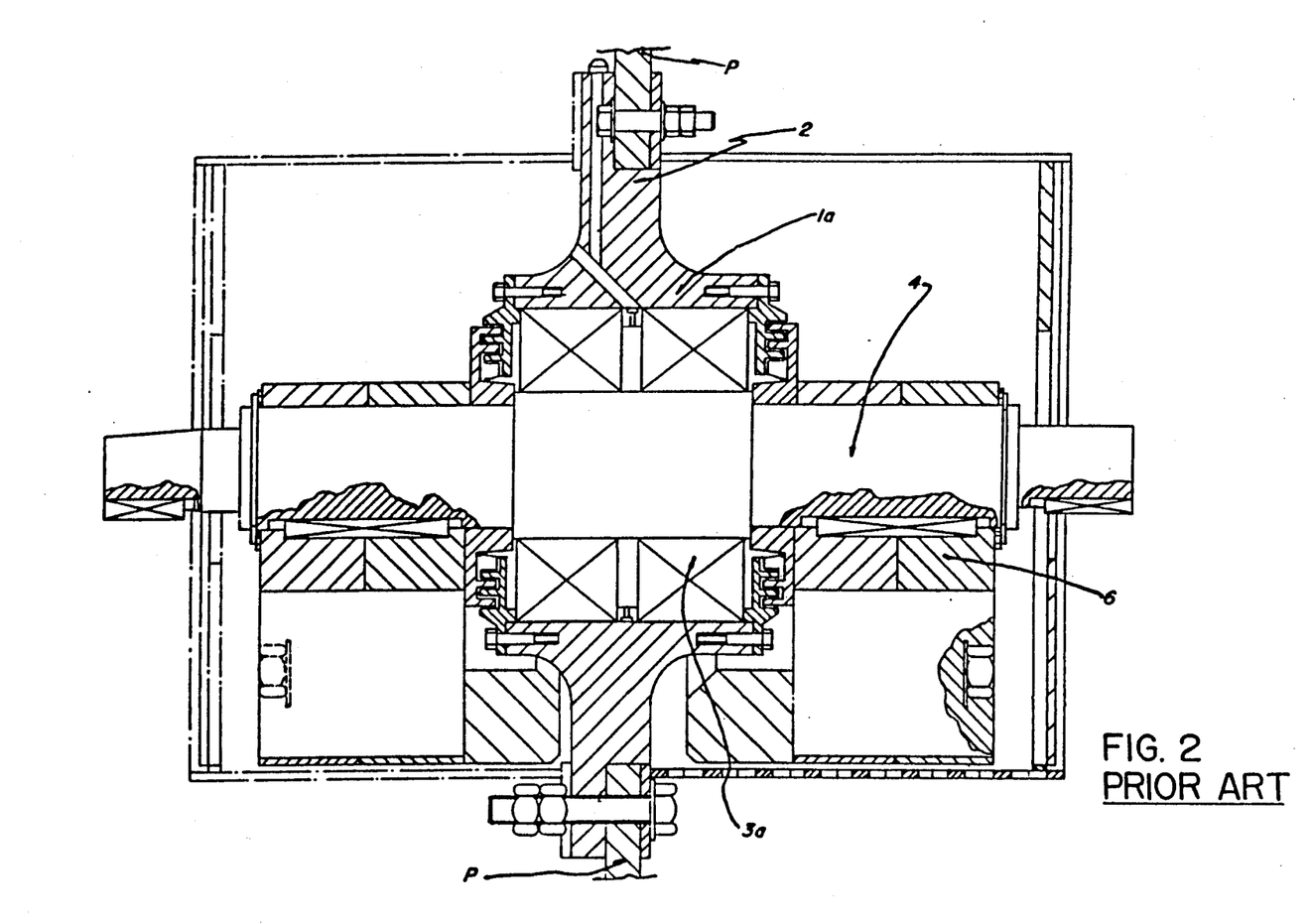
FIG. 2 illustrates a diametral longitudinal section view of a compact vibrator of the prior art.

In order to minimize the above-mentioned problems, compact universal vibrators were developed, as per FIG. 2, composed of a rigid bearing housing with a pair of bearings and incorporating an external middle flange for fixing to respective sideplates of the equipment. The bearings support a short shaft with opposite ends carrying respective adjustable counterweights, one of which stays inside the respective sideplate of the equipment.

Figure 3:
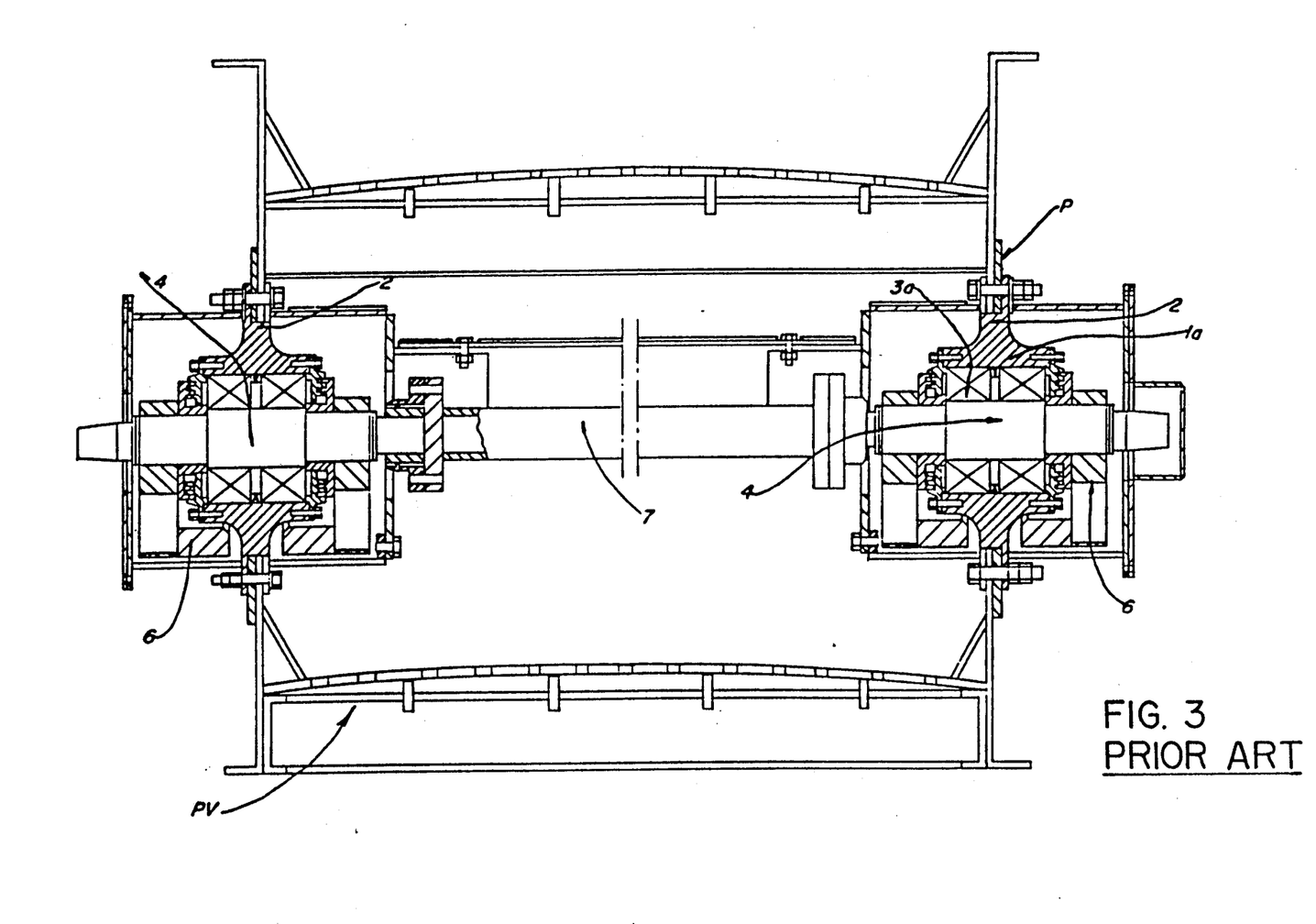
FIG. 3 illustrates a diametral longitudinal section view of a pair of vibrators, of the type shown in FIG. 2, when applied on vibrating screens.

The first prior art mechanism, with a long transversal shaft, was then replaced by a pair of compact universal vibrators, each one being mounted on respective sidewalls or vibrating screen (or other similar equipment) and connected to another vibrator through a portion of a flexible connecting shaft, as per FIG. 3.

Each compact vibrator of the prior art can be replaced as a sealed assembly or package, permitting maintenance in proper area.

In a compact vibrator, of the type mentioned above, load distribution on two bearings instead of usual one in a long shaft arrangement reduces bearing diameters and permits higher rotation speed. Cost and weight of compact arrangement of the type mentioned above are significantly lower than those of known long shaft arrangements, with consequent improvement in maintenance conditions. Nevertheless, despite presenting several advantages over long shaft arrangements, the known compact arrangement (with short shaft) of the prior art introduced some limitations that did not exist in the classic arrangement of long transversal shaft, which includes:

The occupation of a larger internal space of screen (or other equipment) than that required for the classical solution of long shaft;

The setting of the eccentric mass to be effected also inside the equipment, since the counterweights are on both sides of the respective sideplates, of the equipment.

Figure 4:
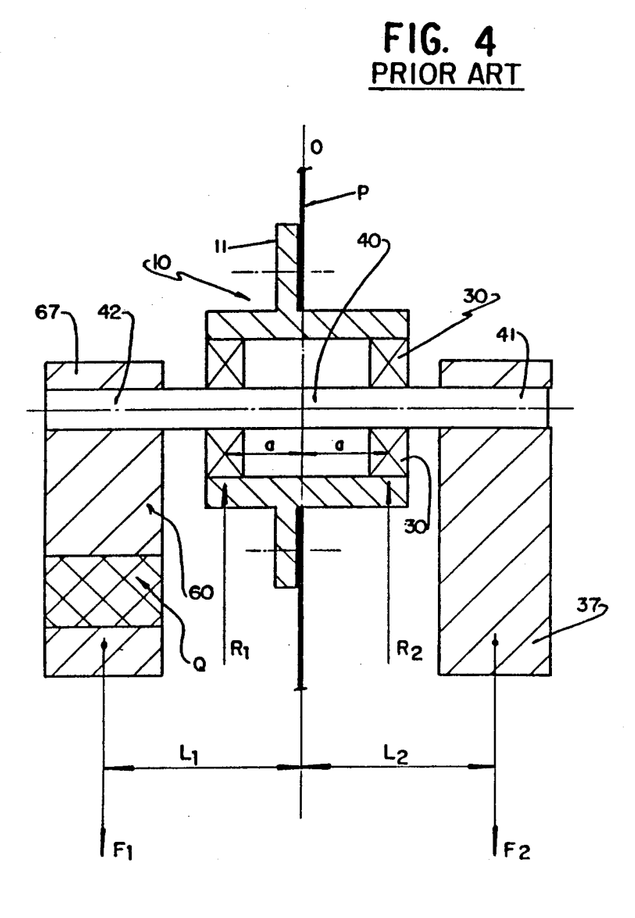
FIG. 4 is a schematic representation of the forces acting on bearings of a compact vibrator of the type shown in FIG. 2, in a balanced condition.

The ideal would be to use a compact vibrator of the prior art, as per FIG. 4, but with setting of eccentric weights only on external sides of the respective sidewalls of the equipment. However, mechanical viability of this arrangement, as per FIG. 4, is highly reduced. It should be noticed that on a balanced situation, as per FIG. 4, no bending moment Mo is applied on the sideplate, since:

$$F1 \cdot L1 = F2x \cdot L2$$

$$R1 = R2 = \frac{F1 + F2}{2}$$

$$Mo = 0$$

Figure 5:
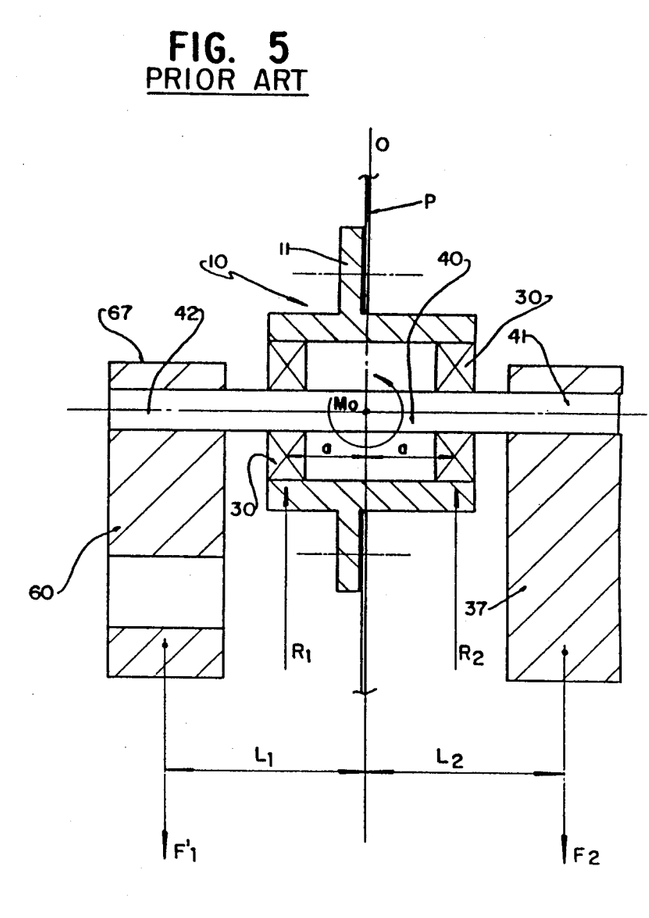
FIG. 5 is a schematic representation of the vibrator shown in FIG. 2, where the balance of load distribution and bending moments was affected by the mass adjustment effected only at the external side of the equipment.

The presence of adjusting weight (Q) only on one side, that is, on the external side, creates an unbalanced situation, as shown in FIG. 5, where:

$$F1 < F1$$

$$F1 \cdot L1 < F2 \cdot Ls$$

$$R1 < R2$$

$$Mo/=0=F2 \cdot L2 - F1 \cdot L1$$

Forces R1 and R2 on the bearings, instead of being equally distributed, as in case of the compact vibrators of FIGS. 2 and 3, are different and amplified.

A bending moment Mo also appears in relation to the sideplates, once equilibrium of bending moments in relation to the center of the mechanism was destroyed. Such bending moment occurrence is unacceptable to the sidewall or sideplate of any vibrating screen or similar equipment.

OBJECTS OF THE INVENTION

Thus, the present invention has the objective to provide a mechanical vibrator for a vibrating screen and/or other equipment, which utilizes a light and short shaft requiring a pair of bearings of reduced dimensions, to be operated in high speed rotation and which can be dismountable in a place away from the installation sites.

Another object is to provide a mechanical vibrator which can be mounted on a sidewall of the equipment, in a way to present counterweight adjustment only externally to this sidewall; and which permits a balanced distribution of forces on bearings and absence of bending moment on the sidewall cf the equipment.

As it has already been mentioned before, the invention applies for a mechanical vibrator of the type that includes a bearing housing provided with an external flange for its fixing to the sideplate of the equipment, supporting, through bearings, a determined medium portion of the shaft, carrying counterweight means and means for connecting the shaft to the drive unit and/or other mechanical vibrator.

BRIEF DESCRIPTION OF THE INVENTION

According to the present invention, the vibrator shaft presents: an internal end portion projecting to outside of a bearing housing, carrying an eccentric counterweight of balance. The counterweight can be axial positioned which is fixed and spaced from the center of the bearing housing. Radial dimensioning, and mass are reduced and predetermined in function of the vibration design. There is an external end portion projecting outside of the bearing housing carrying main eccentric counterweight means, which are at a distance from the center of the bearing housing smaller than that of the counterweight of balance, and a radial dimension and a mass substantially higher than those of the counterweight of balance.

The mass, the radial dimension and the axial positioning of the main counterweight means are selectively variable to equal the bending moments of the main eccentric mass and the balance mass in relation to the center of the bearing housing, and to generate an eccentric force necessary to operate the vibrator, the free end of the external portion of the shaft being provided with means of optional connection to a drive unit.

This new apparatus described above permits obtaining a compact vibrator with shaft and internal counterweight of reduced dimensions, easily dismountable from one of the sidewalls of the equipment, and not applying relevant bending moments to said sidewalls.

The eccentric mass adjustment is made only on the external side of the equipment, maintaining, however, the bending moment unaltered in each case. That is, when the exerted forces are reduced, the distances from the center of the bearing housing to the eccentric masses are proportionally increased.

BRIEF DESCRIPTION OF THE DRAWINGS

The invention is described referring to the following specification and attached drawings, in which.

DETAILED DESCRIPTION OF THE INVENTION

The well known apparatus illustrated on FIG. 1 includes a vibrator composed of a pair of bearing housings 1 containing each one a bearing 3 and mounted on opposite sidewalls (P) of a vibrating screen. The arrangement supports a single elongated shaft 4 with one of its ends carrying a multiple pulley 5 for connecting the shaft to any suitable drive unit.

The other apparatus of the prior art, shown in FIGS. 2 and 3, refers to a compact mechanical vibrator including a bearing housing 1a containing a pair of bearings 3a and incorporating an external flange 2 connectable to one of the sidewalls (P) of a vibrating screen PV. The bearings support a short shaft 4 with its opposite ends carrying respective adjustable counterweights 6.

Each of these vibrators is mounted on one of the sidewalls P of the vibrating screen PV, so as to have its inner ends interconnected by a flexible connecting shaft 7.

FIGS. 6, 7, 8 and 9 illustrate the asymmetric vibrator of the present invention. There is a bearing housing 10, made of steel or case iron, or other suitable material, with an external flange 11. The flange has an end annular recess 12 and a fitting 13 for oil or grease, disposed in a point of the periphery of the flange 11 and connected to the internal face of the bearing housing 10 through a duct or passage 14 provided on the body of the bearing housing.

Figures 7, 7A:
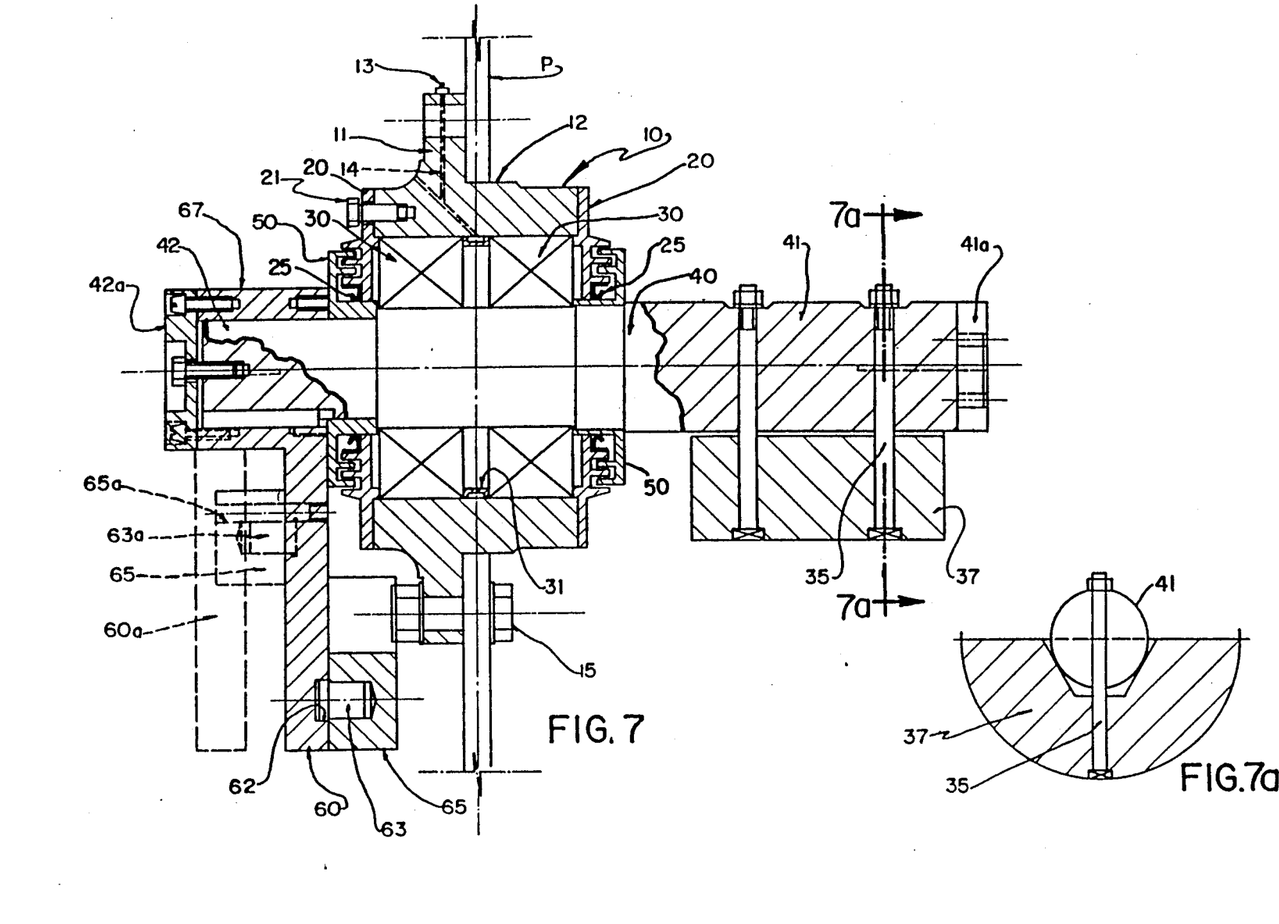
FIG. 7 is a diametral longitudinal section view of the compact mechanical vibrator, of the present invention.
FIG. 7a is a section view of the counterweight of balance 37, taken along line 7a–7a of FIG. 7.
Figure 8:
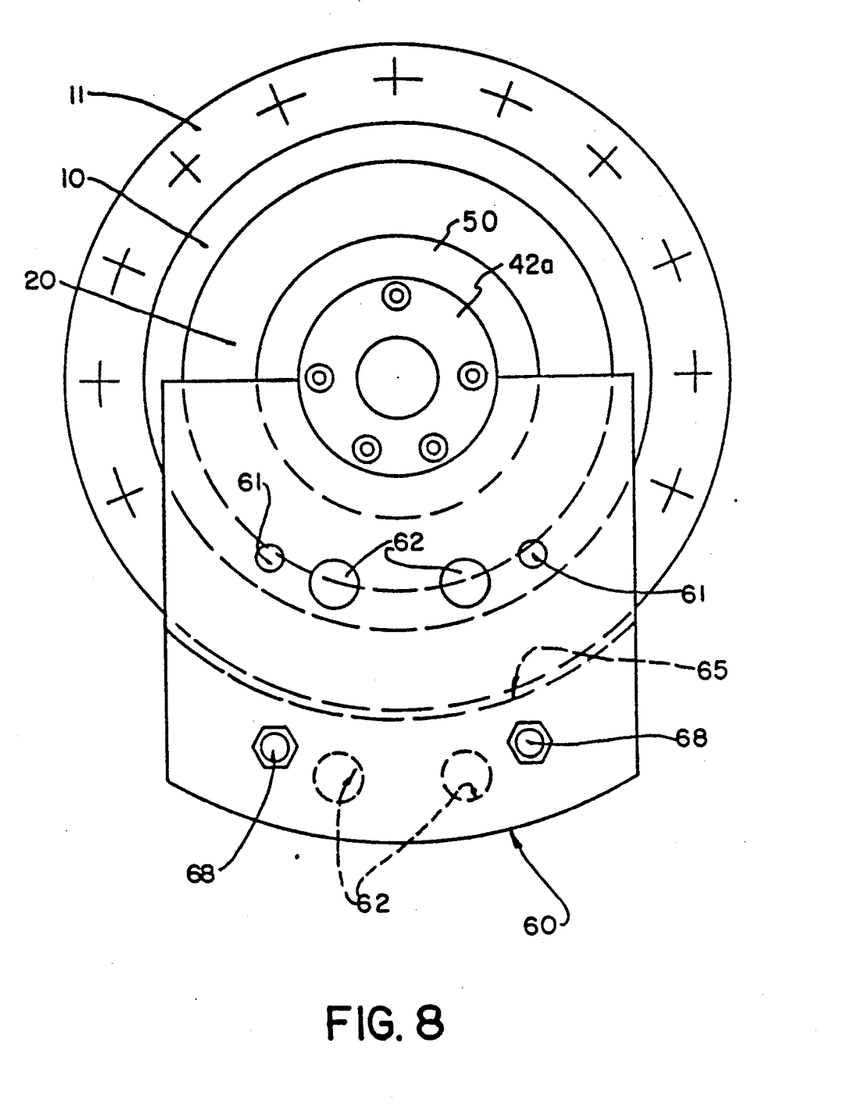
FIG. 8 is an end view of the vibrator shown in FIG. 7.

The bearing housing 10 also holds by two flanges or end covers 20 fastened thereto by bolts 21, a pair of bearings 30 preferably of the anti-friction type, separated from each other by a spacer ring 31 and responsible for supporting the central part of a shaft 40. The bearings 30 are symmetric in relation to sidewall P of the screen.

Figure 9:
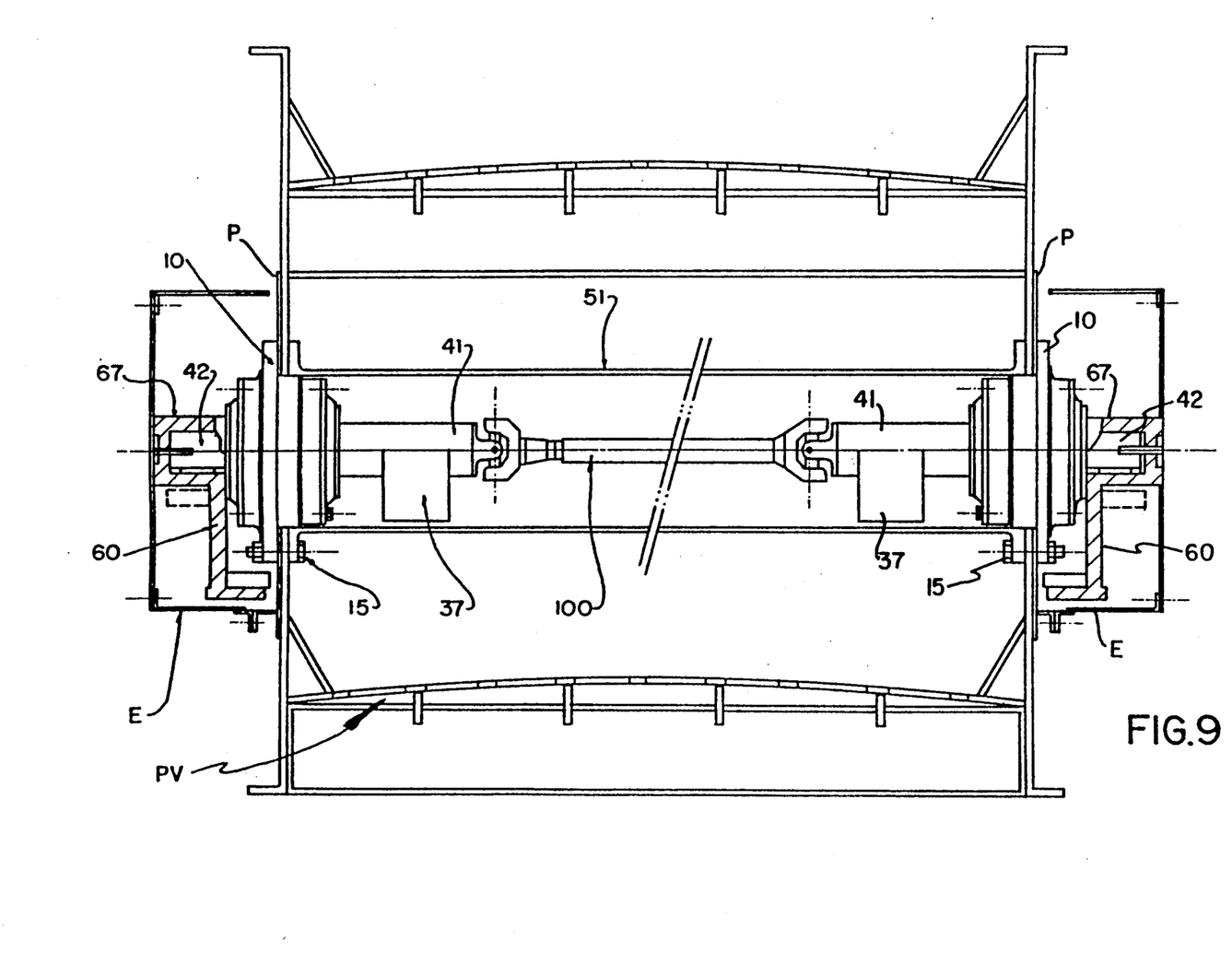
FIG. 9 illustrates a section view of a pair of vibrators shown in FIGS. 10 and 11, when applied on vibrating screens.

The shaft 40 has an internal end potion 41 projecting outwardly from the bearing housing 10 to receive and fix an internal balance counterweight 37 and any means 41a, such as a coupling, for connecting said bearing end portion 41 to a flexible shaft 100 of interconnection between two vibrators fixed on opposite sides of a vibrating screen PV, e.g., such as that shown in FIG. 9. The shaft also has an external end potion 42 projecting outwardly from the bearing housing 10.

As can be seen in FIG. 7, each end cover or flange 20 of the bearing housing 10 is configured to hold axially the pair of bearings 30, so as to define a grease chamber for the bearing housing/bearing assembly and to define a seating element for a seal 25.

As also can be seen, the external face of each of the end flanges or covers 20 of the bearing housing 10 are designed to form a labyrinth, together with a respective counter flange 50 of "L" shaped cross section with its lower leg adjacent to shaft 40 forming the support and wear path for the seal 25 and with the internal face of its upper leg completing the labyrinth mentioned above.

A small balance counterweight 37 corresponding to a small percentage of the eccentric mass is fixed with diametral through bolts 35 to the internal portion of the shaft 41. The balance counterweight 37, in the illustrated example, has the form of a semi-cylindrical body with its diametral face being centrally flattened and seated against the shaft 40.

On the external end portion 42 of the shaft 40 the main counterweight 60 is mounted adjacent to the bearing housing 10, said counterweight having the form of a hammer defined by a substantially rectangular plate, orthogonal to the shaft 40, and having its radially internal end edge incorporating a hub 67 fixable around the end portion 42 of the shaft 40, to avoid relative rotational and axial motions.

The plate 60 is provided with a set of through holes 61 and holes 62 to adapt and fix to any one of its opposite faces, an adjusting counterweight 65 also in the form of a smaller plate provided with through holes 65a alignable with respective set of through holes 61 of main counterweight 60 for the mounting of fixing bolts 68.

The adjustment counterweight 65 further carries projecting centering pins 63 that fit in respective holes 62 of the main counterweight 60.

Figure 6:
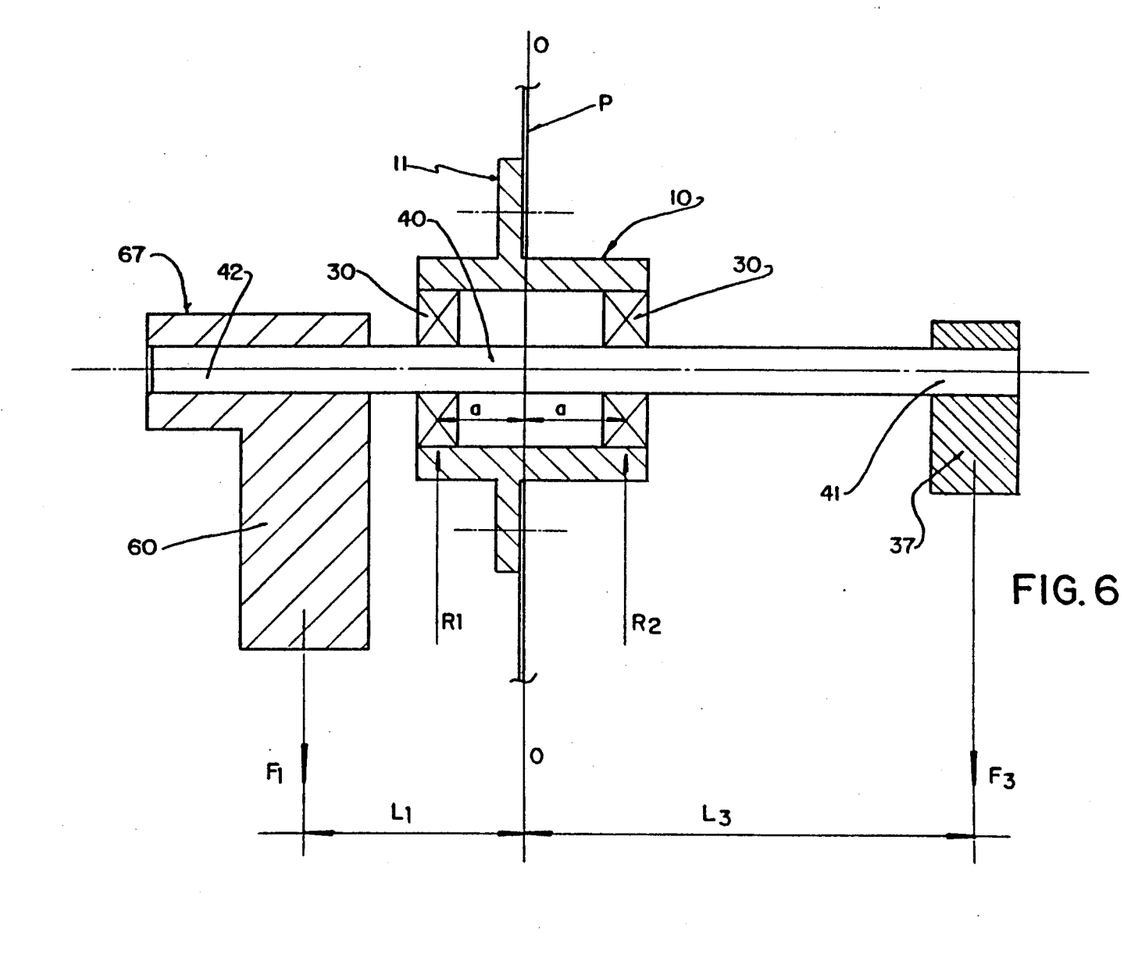
FIG. 6 is a schematic representation of the asymmetric compact vibrator of the present invention, in a balanced condition.

FIG. 6 illustrates schematically a balanced but asymmetric construction of the compact vibrator object of the present invention, as illustrated in FIG. 6.

In the condition of FIG. 6, we have the following situation in terms of acting forces and moments on the bearing housing:

$$F1 \cdot L1 = F3 \cdot L3$$

$$R1 = R2 = \frac{F1 + F3}{2}$$

$$Mo = 0$$

Figure 10:
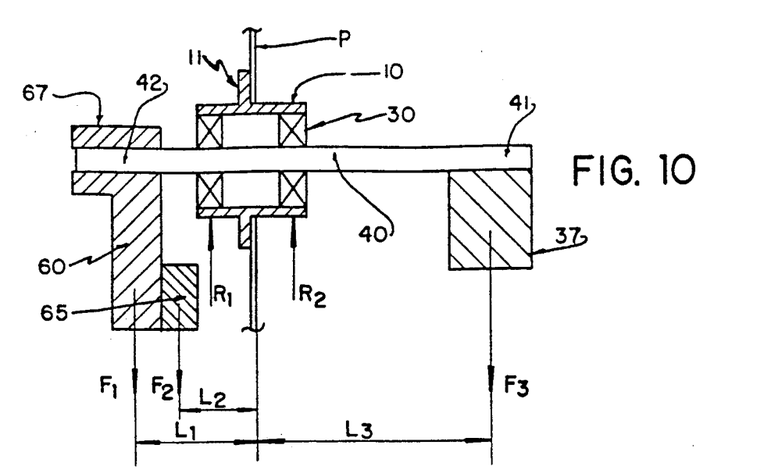
FIGS 10, 11 and 12 represent, schematically, other possibilities to adjust the excitement for the present asymmetric compact vibrator, through displacement of mass, or through the reduction and displacement of the main eccentric mass.

In the condition of maximum excitement of the vibrator shown schematically in FIG. 10, the adjustment counterweight 65 is placed in its radially most external fixing position to the main counterweight 60 so as to generate a centrifugal force F2 localized in a distance L2 near the center of the mechanism. In such situation we have:

$$F1 \cdot L1 + F2 \cdot L2 = F3 \cdot L3$$

$$R1 = R2 = \frac{F1 + F2 + F3}{2}$$

$$Mo = 0$$

Figure 11:
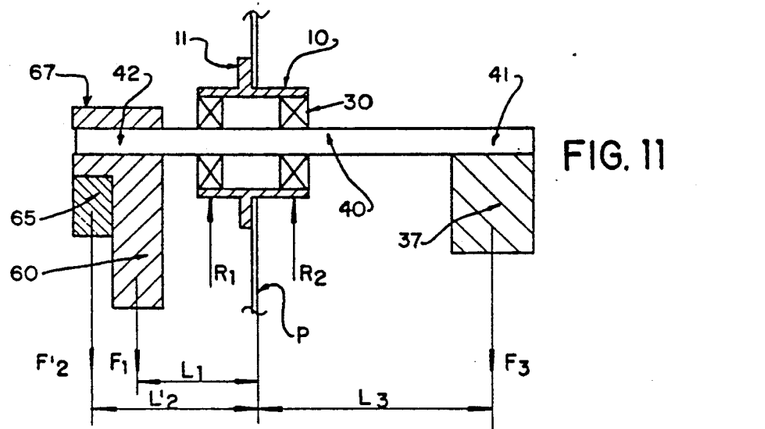

In the condition schematically illustrated in FIG. 11, the counterweight of adjustment 65 was mounted at a smaller radius 50 to generate a centrifugal force F'2 smaller, than the force F2 generated in its positioning of FIG. 10. However, the original distance L2 was increased to L'2 in the same proportion of decrease of radius and elimination of bending moment Mo on the wall P of the equipment.

In the case of FIG. 11, we have the eccentric mass setting through the mass displacement of the external counterweight means 60, 65 maintaining the relations:

$$F2 \cdot L'2 = F2 \cdot L2 \text{ (of FIG. 10)}$$

$$F2 \cdot L'2 + F1 \cdot L1 = F3 \cdot L3$$

$$R1 = R2 = \frac{F1 + F2 + F3}{2}$$

Figure 12:
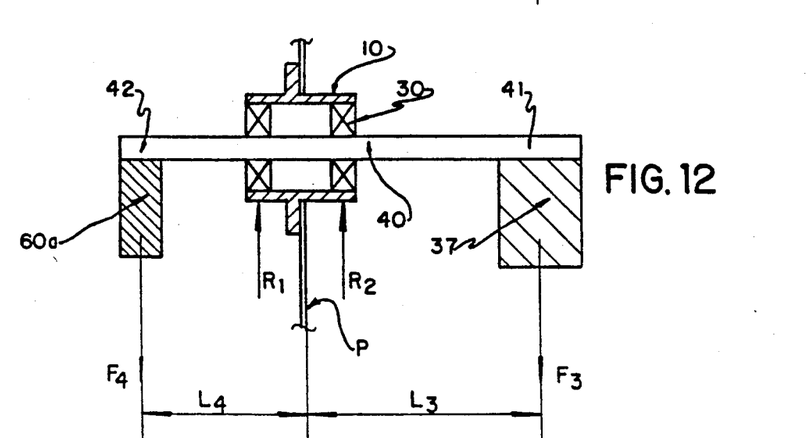

In the setting solution proposed on FIG. 12, the external counterweight 60a has its position changed to provoke a centrifugal force F4, whose value is the same as the force F1 of the preceding examples, but with its distance L4 to the center of the bearing housing 10 being increased to maintain balancing of the set:

$$F4 \cdot L4 = F3 \cdot L3$$

$$R1 = R2 = \frac{F4 + F3}{2}$$

As can be seen, the new constructive solution permits the variation of force generated by the mechanism by changing the position of the external counterweights, or even by eliminating the counterweight of adjustment 65.

In all these cases the setting of the eccentric mass is made on the external side of the equipment, since the weight of balance 37 remains fixed to the internal end 41 of the shaft 40 in a fixed and determined position, maintaining a constant and relatively large distance L3 from the center of the bearing housing 10.

The first setting, when the force generated by mechanism is about 15% reduced, consists in placing the counterweight of balance 65 at a smaller radius, in a position 63a (see FIG. 7) maintaining the bending moment in relation to the screen sideplate P unaltered, as per FIG. 11.

The second setting, with its initial force being approximately 30% reduced, consists in removing the auxiliary counterweight 65 and mounting the main counterweight 60 in the inverted position 60a (see FIG. 7) in order to separate it from the sideplate P, maintaining the conditions of FIG. 12.

As can be seen in FIG. 7, the external recess 12 of external flange 11 is supported and fit against the opening edge of sidewall P of the equipment, to which the vibrator will be applied, the fixation being made through bolts 15. Half the vibrator is thus provided with counterweights 60, 65 and arranged outside the sidewall P, of the equipment, while the other half is placed inside said sidewall.

The external half of the vibrator is protected by a cover E as shown in FIG. 9.

The above-mentioned vibrator provides a compact unit for assembling by flanging for any vibrating application, and may be installed, removed, adjusted, transported and stocked integrally as a single piece, and none of the components need to be disassembled. In terms of maintenance, the construction of the counterweights and adjustment weights as well as the possibility of being installed or removed without disassembling any of the components represent a significant improvement, if compared with existing models as for timing and tools involved in the operation and physical space available for handling as well.

Besides this, as shown in FIG. 9, the present vibrator occupies a reduced internal space, in which it is applied, allowing enclosure of the equipment in a protecting tube 51 of smaller diameter.

FIG. 9 illustrates the assembly of a pair of vibrators built in accordance with this invention for a vibrating screen PV, said vibrators being interconnected by means of a flexible internal shaft 100 with its ends being coupled to the connecting means 41a a provided on the internal end portions of both shafts 40.

The free end of the external end portions 42, provided with respective coupling means 42a, is connected to a shaft (not illustrated) from a proper drive unit.

What is claimed is:

1. An asymmetric mechanical vibrator for vibrating screens and other equipment, comprising:

a housing having bearings therein fixable to a part of the equipment;

a shaft supported by said bearings, the shaft having an end portion inside the equipment and carrying an axially positionable first balance eccentric counterweight, fixed and spaced from the center of the bearing housing by a first distance and having a predetermined mass and maximum radial extension;

said shaft having an end portion external to the equipment projecting outwardly from the bearing housing and carrying a second eccentric counterweight means spaced away from the center of the bearing housing by a second distance smaller than the first distance of the first balance counterweight to the center of the bearing housing and having a maximum radial dimension and mass larger than that of said first balance counterweight, the axial positioning, radial dimension and mass of the second counterweight means being selectively variable to generate determined eccentric forces on the vibrator and bending moments of the balanced rotating eccentric counterweights to equalize the distribution of load on the bearings of the bearing housing.

2. An asymmetric mechanical vibrator for vibrating screens and other equipment, comprising:

a housing having bearings therein fixable to a part of the equipment;

a shaft supported by said bearing, the shaft having an end portion inside the equipment and carrying an axially positionable first balance eccentric counterweight, fixed and spaced form the center of the bearing housing by a first distance and having a predetermined mass and maximum radial extension;

said shaft having an end portion external to the equipment projecting outwardly from the bearing housing and carrying a second eccentric counterweight means spaced away from the center of the bearing housing by a second distance smaller than the first distance of the first balance counterweight to the center of the bearing housing and having a maximum radial dimension and mass larger than that of said first balance counterweight, the axial positioning, radial dimension and mass of the second counterweight means being selectively variable to generate determined eccentric forces on the vibrator and bending moments of the balanced rotating eccentric counterweights to equalize the distribution of load on the bearings of the bearing housing; the second counterweight means comprising a main counterweight fixable to the external end portion of the shaft in at least two different axial positions and an adjustable third counterweight removably coupled to the second counterweight and capable of being coupled to said second counterweight in at least two different radial positions associated with two opposite axial positions.

3. A vibrator, in accordance with claim 2, wherein said second counterweight comprises a substantially rectangular plate, orthogonal to the shaft with an end edge incorporated in a hub fixable on the external end portion of the shaft.

4. A vibrator, in accordance with claim 3, wherein said second counterweight has opposite faces and the third counterweight comprises a plate for seating against either of the opposite faces of the second counterweight.

5. A vibrator, in accordance with claim 3, wherein the third counterweight comprises pins for fitting into corresponding holes provided on opposite faces of the second counterweight and through holes alignable to corresponding passing holes of the second counterweight for the passing of fixing bolts.

6. A vibrator in accordance with claim 2 wherein each combination of the possible operational positions of the second counterweight with the possible operational positions of the third counterweight produces an eccentric force and a bending moment, equal to that produced by rotation of the first counterweight with the vibrator operating.

* * * * *